US012799332B2

(12) United States Patent
Sakamoto et al.

(10) Patent No.: US 12,799,332 B2
(45) Date of Patent: Nov. 17, 2026

(54) HALOGENATED ZINC PHTHALOCYANINE PIGMENT AND PRODUCTION METHOD FOR SAME

(71) Applicant: DIC Corporation, Tokyo (JP)

(72) Inventors: Keisuke Sakamoto, Sakura (JP); Yuji Tamura, Sakura (JP); Kentaro Oishi, Sakura (JP); Yuta Hidaka, Sakura (JP); Takeshi Yamada, Sakura (JP); Ryousuke Asami, Sakura (JP); Kengo Yasui, Sakura (JP); Mayumi Tokuoka, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 294 days.

(21) Appl. No.: 18/013,406

(22) PCT Filed: Jun. 3, 2021

(86) PCT No.: PCT/JP2021/021120
§ 371 (c)(1),
(2) Date: Dec. 28, 2022

(87) PCT Pub. No.: WO2022/004261
PCT Pub. Date: Jan. 6, 2022

(65) Prior Publication Data
US 2023/0287218 A1 Sep. 14, 2023

(30) Foreign Application Priority Data
Jul. 1, 2020 (JP) ................................ 2020-114135

(51) Int. Cl.
*C09B 47/10* (2006.01)
*C09B 67/20* (2006.01)
*C09B 67/50* (2006.01)

(52) U.S. Cl.
CPC .......... *C09B 47/10* (2013.01); *C09B 67/0026* (2013.01); *C09B 67/006* (2013.01)

(58) Field of Classification Search
CPC .... C09B 47/10; C09B 67/0026; C09B 67/006
See application file for complete search history.

(56) References Cited

U.S. PATENT DOCUMENTS

2011/0096274 A1* 4/2011 Shimizu ............ G02F 1/133514 349/106
2016/0177100 A1* 6/2016 Mochizuki ........... C07D 471/04 428/195.1

FOREIGN PATENT DOCUMENTS

JP 2010163480 A * 7/2010 ............. C09B 47/10
JP 2013214000 A * 10/2013 ............... G02B 5/20
(Continued)

OTHER PUBLICATIONS

International Search Report dated Aug. 31, 2021, issued in counterpart International Application No. PCT/JP2021/021120 (3 pages).
(Continued)

*Primary Examiner* — Bijan Ahvazi
(74) *Attorney, Agent, or Firm* — WHDA, LLP

(57) ABSTRACT

The halogenated zinc phthalocyanine pigment is for use as a green pigment for color filters and capable of achieving high brightness. In the halogenated zinc phthalocyanine pigment, when a coating film containing 1.00 part by mass of the pigment, 0.95 parts by mass of a benzyl methacrylate-methacrylic acid copolymer, and 0.30 parts by mass of a dimethylaminoethyl methacrylate copolymer is heated at 230° C. for one hour to form an evaluation coating film having a thickness of 4 μm, an average scattering intensity at scattering angles 2θ in a range of 17° to 21° is determined from a two-dimensional scattering image obtained by GI-WAXS measurement of the evaluation coating film, and a normalized average scattering intensity is determined such
(Continued)

that the average scattering intensity at an azimuth of 45° is 1, the normalized average scattering intensity at azimuths of 5° to 89° is 0.70 to 1.15.

1 Claim, 3 Drawing Sheets

(56) References Cited

FOREIGN PATENT DOCUMENTS

| | | | | | |
|---|---|---|---|---|---|
| JP | 2018-97377 | A | | 6/2018 | |
| JP | 2018097377 | A | * | 6/2018 | C08K 5/09 |
| JP | WO-2018043548 | A1 | * | 9/2018 | C09B 67/20 |
| JP | 2020-33525 | A | | 3/2020 | |
| JP | 2020033525 | A | * | 3/2020 | C09B 25/00 |
| WO | 2018/043548 | A1 | | 3/2018 | |

OTHER PUBLICATIONS

Notice of Reasons for Refusal dated Mar. 8, 2022, issued in counterpart JP Patent Application No. 2021-574278, w/English translation (6 pages).
Decision of Refusal dated Jul. 12, 2022, issued in counterpart JP Patent Application No. 2021-574278, w/English translation (4 pages).
Written Request for Trial and Appeal dated Oct. 11, 2022, issued in counterpart JP Patent Application No. 2021-574278, w/English translation (16 pages).

* cited by examiner

[Fig.1]
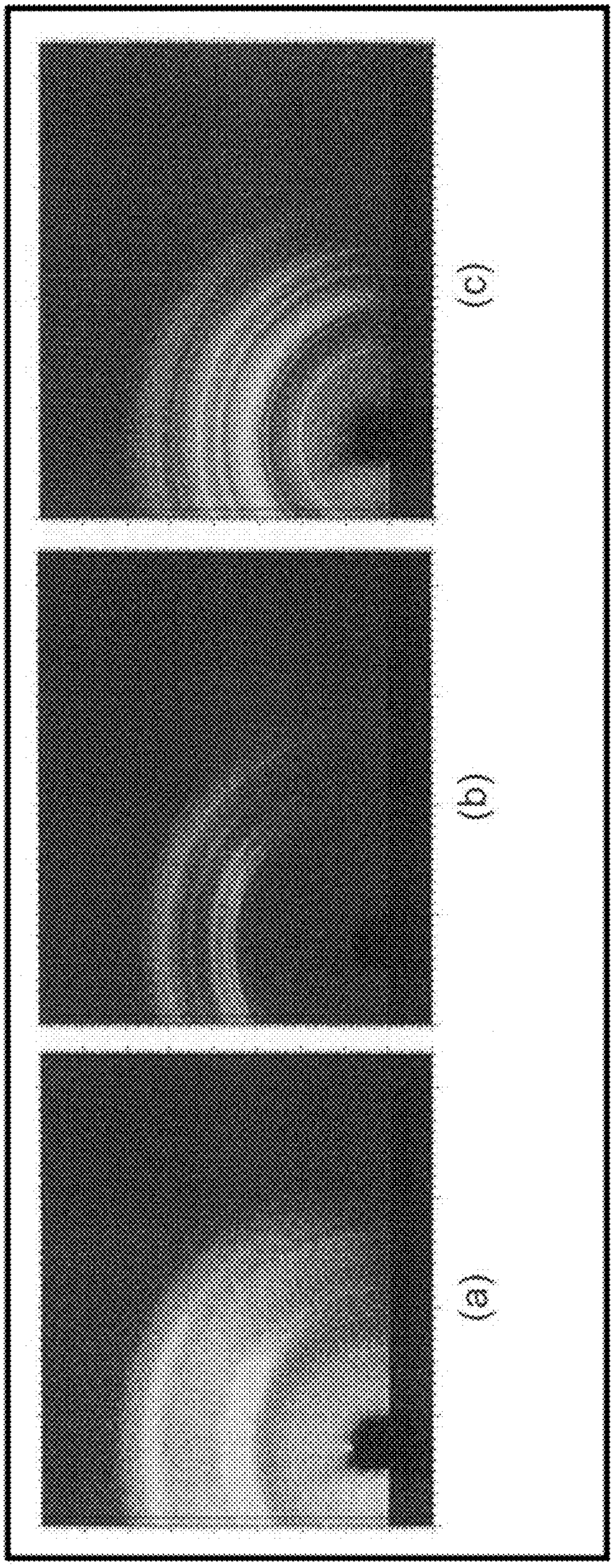

[Fig.2]
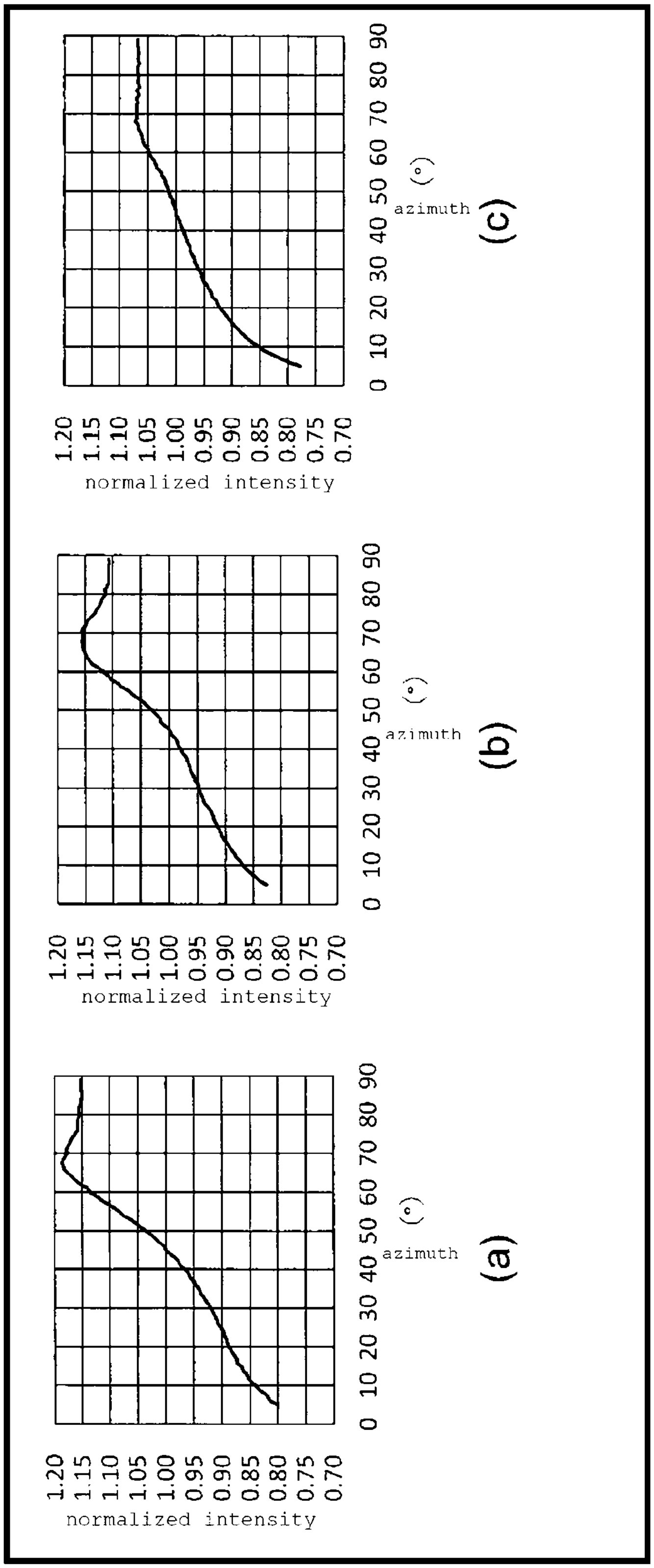

[Fig.3]
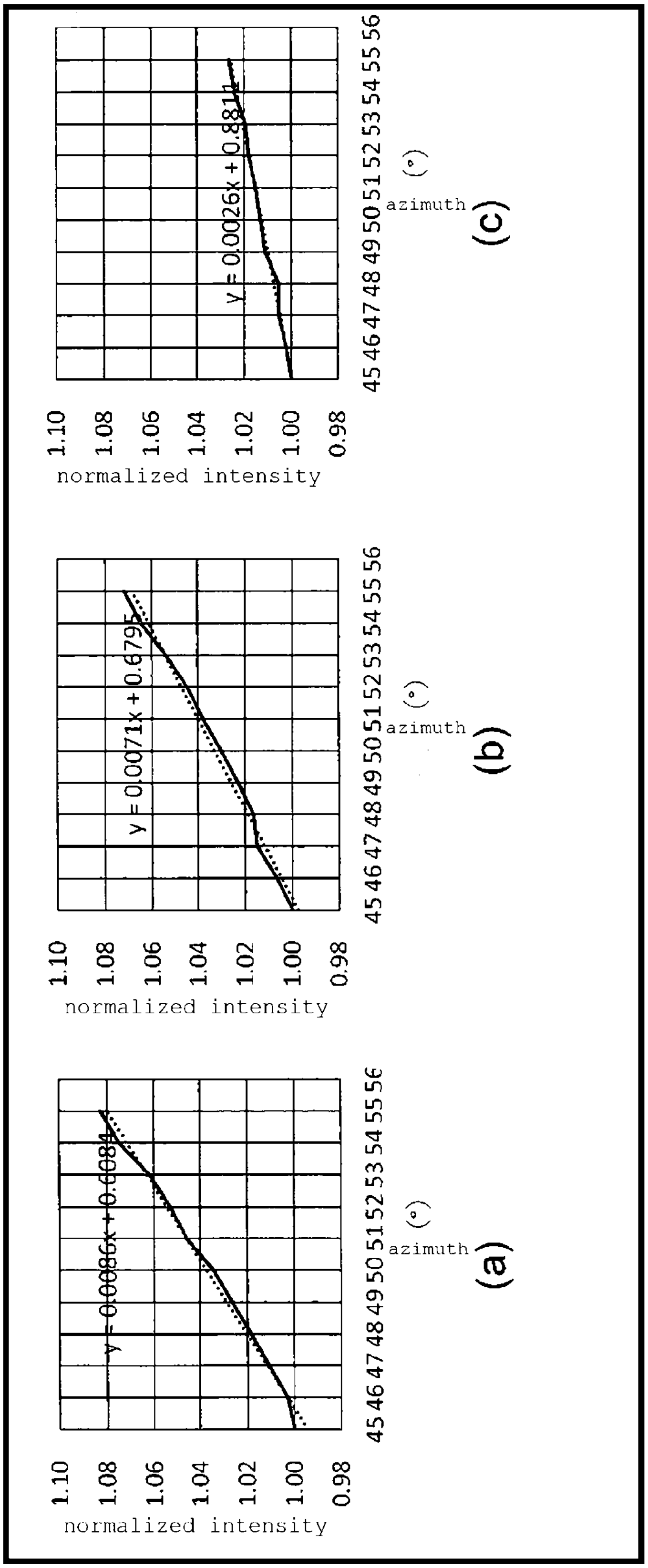

HALOGENATED ZINC PHTHALOCYANINE PIGMENT AND PRODUCTION METHOD FOR SAME

TECHNICAL FIELD

The present invention relates to a halogenated zinc phthalocyanine pigment and a production method for the same.

BACKGROUND ART

Coloring compositions are now used in various fields. Specific applications of coloring compositions include printing inks, paints, coloring agents for resins, coloring agents for textiles, and color materials for IT information recording (color filters, toners, inkjet printing). Colorants used in coloring compositions can be broadly classified into pigments and dyes, and organic pigments considered superior in color strength are attracting attention.

An organic compound that makes up an organic pigment exists in the form of aggregates or agglomerates (hereinafter collectively referred to as "aggregates"), called crude, after synthesis, in which fine particles aggregate or agglomerate together. For this reason, the organic compound after synthesis is usually unable to be used as it is as a pigment, and a pigmentation step is performed to adjust the particle size. The aggregate (crude) of the organic compound to be pigmented in the pigmentation step is called crude pigment, and the crude pigment is ground by kneading or the like to produce a fine organic pigment.

Halogenated zinc phthalocyanine pigments used in, for example, green pixel sections of color filters have attracted attention as an organic pigment (see, for example, PTL 1).

CITATION LIST

Patent Literature

PTL 1: WO 2018/043548

SUMMARY OF INVENTION

Technical Problem

An object of the present invention is to provide a halogenated zinc phthalocyanine pigment for use as a green pigment for color filters and capable of achieving high brightness, and a production method for the same.

Solution to Problem

The use of pigments with a small primary particle size (fine pigments) has been considered to be particularly effective in improving brightness which is a characteristic value of color filters. Pigments that enable even higher brightness in color filters therefore have been developed in terms of how crude pigments are processed into finer pigments in the pigmentation step.

However, since there is a limit to make finer pigments, the inventors of the present invention have conducted studies to achieve higher brightness by a method other than making finer pigments. In the process of studies, the inventors conducted advanced analysis of halogenated zinc phthalocyanine before pigmentation (crude pigment) and found that a color filter using the crude pigment has a strong orientation in a direction horizontal to the coating film. The inventors then conceived of pigmentation by a method that can mitigate the orientation better than conventional pigmentation methods using kneading machines such as kneaders, and conducted further studies and completed the present invention.

One aspect of the present invention relates to a halogenated zinc phthalocyanine pigment. When a coating film containing 1.00 part by mass of the halogenated zinc phthalocyanine pigment, 0.95 parts by mass of a benzyl methacrylate-methacrylic acid copolymer, and 0.30 parts by mass of a dimethylaminoethyl methacrylate copolymer is heated at 230° C. for one hour to form an evaluation coating film having a thickness of 4 μm, an average scattering intensity at scattering angles 2 in a range of 17° to 21° is determined from a two-dimensional scattering image obtained by GI-WAXS measurement of the evaluation coating film, and a normalized average scattering intensity is determined such that the average scattering intensity at an azimuth of 45° is 1, the normalized average scattering intensity at azimuths of 5° to 89° is 0.70 to 1.15.

The halogenated zinc phthalocyanine pigment in the above aspect can improve the brightness of green color filters.

In one aspect, the average primary particle size of the pigment is preferably 30 nm or less.

Advantageous Effects of Invention

The present invention can provide a halogenated zinc phthalocyanine pigment for use as a green pigment for color filters and capable of achieving high brightness, and a production method for the same.

BRIEF DESCRIPTION OF DRAWINGS

FIG. 1 is a diagram illustrating two-dimensional scattering images of a reference example, a comparative example, and an example.

FIG. 2 is a diagram illustrating azimuth profiles at azimuths of 5° to 89° of the reference example, the comparative example, and the example.

FIG. 3 is a diagram illustrating azimuth profiles at azimuths of 45° to 55° of the reference example, the comparative example, and the example.

DESCRIPTION OF EMBODIMENTS

Preferred embodiments of the present invention will be described below. However, the present invention is not limited to the following embodiments.

<Halogenated Zinc Phthalocyanine Pigment>

A halogenated zinc phthalocyanine pigment of one embodiment is formed of one or more particles containing one or more halogenated zinc phthalocyanines with different numbers of halogen atoms. Here, the halogenated zinc phthalocyanine is a compound having a structure represented by the following formula (1).

[Chemical Formula 1]

(1)

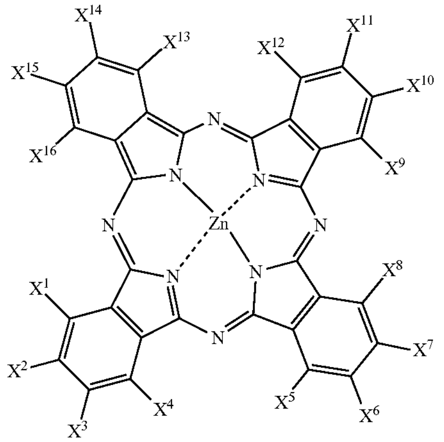

[In Formula (1), $X^1$ to $X^{16}$ each independently represent a hydrogen atom or a halogen atom.]

Examples of the halogen atom include fluorine, chlorine, bromine, and iodine atoms. The halogenated zinc phthalocyanine preferably has at least one of a bromine atom and a chlorine atom as the halogen atom, and more preferably has a bromine atom. The halogenated zinc phthalocyanine may have one or both of a chlorine atom and a bromine atom as the halogen atom. In other words, $X^1$ to $X^{16}$ in the above formula (1) may be a chlorine atom or a bromine atom.

In one aspect, the average number of bromine atoms in a molecule of the compound represented by formula (1) in the halogenated zinc phthalocyanine pigment is less than 13. The average number of bromine atoms may be 12 or less or 11 or less. The average number of bromine atoms may be 0.1 or more, 6 or more, or 8 or more. The upper and lower limits described above can be combined as desired. For example, the average number of bromine atoms may be 0.1 or more and less than 13, 8 to 12, or 8 to 11. In the following similar description, the upper and lower limits described individually can be combined as desired.

When the average number of bromine atoms is less than 13, the average number of halogen atoms in a molecule of the compound represented by formula (1) in the halogenated zinc phthalocyanine pigment may be 14 or less, 13 or less, less than 13, or 12 or less. The average number of halogen atoms is 0.1 or more, and may be 8 or more, or 10 or more.

When the average number of bromine atoms is less than 13, the average number of chlorine atoms in a molecule of the compound represented by formula (1) in the halogenated zinc phthalocyanine pigment may be 5 or less, 3 or less, 2.5 or less, or less than 2. The average number of chlorine atoms may be 0.1 or more, 0.3 or more, 0.6 or more, 0.8 or more, 1 or more, 1.3 or more, or 2 or more.

In another aspect, the average number of bromine atoms in a molecule of the compound represented by formula (1) in the halogenated zinc phthalocyanine pigment is 13 or more. The average number of bromine atoms may be 14 or more. The average number of bromine atoms may be 15 or less.

When the average number of bromine atoms is 13 or more, the average number of halogen atoms in a molecule of the compound represented by formula (1) in the halogenated zinc phthalocyanine pigment may be 13 or more, 14 or more, or 15 or more. The average number of halogen atoms is 16 or less, and may be 15 or less.

When the average number of bromine atoms is 13 or more, the average number of chlorine atoms in a molecule of the compound represented by formula (1) in the halogenated zinc phthalocyanine pigment may be 0.1 or more or 1 or more. The average number of chlorine atoms may be 3 or less or less than 2.

The number of halogen atoms (e.g., the number of bromine atoms and the number of chlorine atoms) can be identified, for example, by mass spectrometry of the halogenated zinc phthalocyanine pigment using a matrix-assisted laser desorption/ionization time-of-flight mass spectrometer (e.g., JMS-S3000 from JEOL Ltd.). Specifically, the number of each halogen atoms can be calculated as a relative value per zinc atom, from the mass ratio of each halogen atoms to zinc atoms in the halogenated zinc phthalocyanine pigment.

In one aspect, the halogenated zinc phthalocyanine pigment has an orientation parameter (A) of 0.70 to 1.15. As used herein the orientation parameter (A) is a parameter derived by grazing-incidence wide-angle X-ray scattering (GI-WAXS) measurement of a 4 μm thick evaluation coating film formed using 1.00 part by mass of the halogenated zinc phthalocyanine pigment and 1.25 parts by mass of a resin.

GI-WAXS measurement is a method for measuring X-ray scattering generated by incident X-rays entering a sample surface (a surface of the evaluation coating film) at a small angle of approximately 0.1°. In GI-WAXS measurement, structural information of a sample can be obtained by irradiating a sample surface with X-rays and measuring the scattering X-rays with large scattering angles. Specifically, the X-ray scattered light from the sample is exposed with a two-dimensional detector, whereby an annular profile (azimuth intensity distribution) of the scattering intensity around the X-ray beam center can be obtained as a two-dimensional X-ray scattering image (scattering profile). The obtained two-dimensional X-ray scattering image is analyzed to provide structural information of the sample. GI-WAXS measurement is used for crystal structure analysis as well as for obtaining information on the orientation of the sample.

In general, when the sample has random orientations, X-ray scattering from the sample exhibits uniform annular scattering on the two-dimensional detector plane. In contrast, it is known that when the sample has a horizontal orientation, X-ray scattering is stronger in the vertical direction on the two-dimensional detector plane, and when the sample has a vertical orientation, X-ray scattering is stronger in the horizontal direction on the two-dimensional detector plane. The orientation of the sample therefore can be determined by analyzing the two-dimensional X-ray scattering image (the annular profile of the scattering intensity around the X-ray beam center) obtained at the two-dimensional detector. The orientation parameter (A) quantitatively represents the intensity of orientation of the sample analyzed by this method.

Specifically, the orientation parameter (A) is determined as follows. First, the average scattering intensity at scattering angles 2 in the range of 17° to 21° is obtained in the azimuth range of 5° to 89° from the two-dimensional scattering image obtained by GI-WAXS measurement. As used herein the azimuth is the angle where the horizontal plane of the detector is 0°. Each average scattering intensity at azimuths of 5° to 89° is then divided by the average scattering intensity at an azimuth of 45° and thereby normalized such that the value at an azimuth of 45° is 1. The normalized average scattering intensity at azimuths of 5° to 89° (normalized average scattering intensity) obtained in this way is defined as the orientation parameter (A).

Since the normalized average scattering intensity indicates the intensity of orientation, the orientation parameter (A) of 0.70 to 1.15 means that the intensity of orientation (minimum and maximum values of the normalized average scattering intensity at azimuths of 5° to 89°) falls within a certain range.

Specifically, the evaluation coating film for use in GI-WAXS measurement can be obtained by forming a coating film of an evaluation composition containing 1.00 part by mass of the halogenated zinc phthalocyanine pigment, 1.25 parts by mass of a resin, and an organic solvent on a glass substrate, drying the resulting coating film to remove the organic solvent, and then heating the coating film at 230° C. for one hour. Here, the resin contains 0.95 parts by mass of a copolymer of benzyl methacrylate and methacrylic acid (benzyl methacrylate-methacrylic acid copolymer) and 0.30 parts by mass of a copolymer containing dimethylaminoethyl methacrylate as a polymerization unit (dimethylaminoethyl methacrylate copolymer).

The benzyl methacrylate-methacrylic acid copolymer is provided, for example, as UNIDIC ZL-295 (a solution with a solid content of 40% by mass) from DIC Corporation. The weight average molecular weight Mw of the benzyl methacrylate-methacrylic acid copolymer is, for example, 12000 to 16000.

The dimethylaminoethyl methacrylate copolymer is provided, for example, as BYK-LPN6919 (a solution with a solid content of 60% by mass) from BYK-Chemie GmbH. The weight average molecular weight Mw of the dimethylaminoethyl methacrylate copolymer is, for example, 7000 to 11000.

The dimethylaminoethyl methacrylate copolymer is a copolymer that provides a pigment dispersion having a viscosity at 25° C. of 10 mPa·s or less when the pigment dispersion is produced, for example, by dispersing 30 g of Pigment Green 58 (e.g., FASTOGEN Green A110 from DIC Corporation), 22.5 g of a resin solution of the benzyl methacrylate-methacrylic acid copolymer with a solid content of 40% by mass (e.g., ZL-295 from DIC Corporation), 132.5 g of propylene glycol monomethyl ether acetate, and 15 g of a resin solution of the dimethylaminoethyl methacrylate copolymer with a solid content of 60% by mass for two hours with a paint shaker using 460 g of 0.3 to 0.4 mm zircon beads. The above viscosity is measured by a cone-plate rotational viscometer (cone-plate viscometer) (e.g., RE550L of Toki Sangyo Co., Ltd.) according to JIS Z8803.

As the organic solvent, an organic solvent that does not dissolve the halogenated zinc phthalocyanine but can dissolve the resin is preferred. Specifically, propylene glycol monomethyl ether acetate is preferred.

The evaluation composition may be prepared, for example, by dispersing 0.992 parts by mass of the halogenated zinc phthalocyanine pigment with 0.744 parts by mass of a resin solution of the benzyl methacrylate-methacrylic acid copolymer with a solid content of 40% by mass, 0.496 parts by mass of a resin solution of the dimethylaminoethyl methacrylate copolymer with a solid content of 60% by mass, and 4.368 parts by mass of the organic solvent for two hours with a paint shaker (e.g., a paint shaker from Toyo Seiki Seisaku-sho, Ltd.) using 15.2 parts by mass of 0.3 to 0.4 mm zircon beads to produce a pigment dispersion, and then mixing 3.000 parts by mass of the resulting pigment dispersion, 0.735 parts by mass of a resin solution of the benzyl methacrylate-methacrylic acid copolymer with a solid content of 40% by mass, and 0.165 parts by mass of the organic solvent using a paint shaker (e.g., a paint shaker from Toyo Seiki Seisaku-sho, Ltd.).

The coating film of the evaluation composition can be formed, for example, by spin coating. The conditions of spin coating (the rotation speed and the amount of evaluation composition) are adjusted so that the resulting coating film is 4 μm thick. The glass substrate used in forming the coating film of the evaluation composition is preferably so-called white glass made of a material with a high transparency, such as borosilicate glass. For example, Corning (registered trademark) EAGLE XG can be used as such a glass substrate.

The drying conditions are, for example, 70 to 100° C. for 1 to 10 minutes.

GI-WAXS measurement can be performed under the following conditions: a substrate with a sample (evaluation coating film) smoothly produced on the substrate is placed on the sample stand of a GI-WAXS measurement system (grazing-incidence X-ray scattering system) such that the distance from the center of the sample (the center of the surface of the evaluation coating film) to the detector is 102.5 mm, the X-ray wavelength is 0.1 nm, and the X-ray incident angle is 0.06°.

In order to accurately determine the scattering profile of the evaluation coating film by GI-WAXS measurement, it is necessary to measure more (specifically, equal to or more than $10^{16}$ (photons/sec/mm$^2$/mrad$^2$/0.1% bandwidth)) X-ray scattering. For this, in GI-WAXS measurement, it is preferable to use a high-brilliance X-ray source that enables measurement of more scattering in a short time. To obtain a high-brilliance X-ray source, a light source in a large synchrotron radiation facility, such as SPring-8 in Hyogo Prefecture or PhotonFactory in Ibaraki Prefecture, can be used.

In the GI-WAXS measurement system in a synchrotron radiation facility, white light taken out from a circular accelerator called a storage ring is monochromatized with a double crystal monochromator, and using a wavelength in the X-ray region (e.g., 1 Å) as a source, X-rays are directed to the center of the sample (the center of the surface of the evaluation coating film) on the substrate with the sample placed on the sample stand, and the scattered light is exposed with a two-dimensional detector. A two-dimensional X-ray scattering image thus can be obtained.

The halogenated zinc phthalocyanine pigment having an orientation parameter (A) in the above range contributes to achievement of high brightness when used as a green pigment for color filters. The reason for this effect is as follows. If the halogenated zinc phthalocyanine pigment is oriented in a color filter, white light (white transmitted light) transmitted through the color filter is scattered, resulting in decrease in brightness and contrast, whereas the halogenated zinc phthalocyanine pigment having an orientation parameter (A) of 0.70 to 1.15 is less likely to be oriented in the color filer. Based on this, presumably, the use of the halogenated zinc phthalocyanine pigment suppresses scattering of white transmitted light. When the halogenated zinc phthalocyanine pigment having an orientation parameter (A) in the above range is used as a green pigment for color filters, high contrast also tends to be achieved. This is also presumably for the same reason as above.

The orientation parameter (A) is preferably 0.73 to 1.14 and more preferably 0.75 to 1.13, in terms of easily achieving higher brightness and contrast.

In another aspect, the halogenated zinc phthalocyanine pigment has an orientation parameter (C) of −0.006 to 0.006. The orientation parameter (C) is a parameter derived from GI-WAXS measurement of a 4 μm thick evaluation coating film formed using 1 part by mass of the halogenated zinc phthalocyanine pigment and 1.25 parts by mass of a resin, in the same manner as the orientation parameter (A) described above. The evaluation composition, the method of forming the evaluation coating, and the like used in the measurement, and the GI-WAXS measurement method are the same as those for the orientation parameter (A).

Specifically, the orientation parameter (C) is determined as follows. First, the average scattering intensity at scattering angles 2θ in the range of 17° to 21° is obtained in the azimuth range of 45° to 55° from the two-dimensional scattering image obtained by GI-WAXS measurement. Each average scattering intensity at azimuths of 45° to 55° is then divided by the average scattering intensity at an azimuth of 45° and thereby normalized such that the value at an azimuth of 45° is 1. Then, an azimuth profile (a graph with the azimuth on the horizontal axis) with the normalized average scattering intensity obtained above (normalized average scattering intensity) on the vertical axis is created in the azimuth range of 45° to 55° and subjected to linear approximation, and the slope of the resulting approximate line is defined as the orientation parameter (C).

As a result of studies, the inventors of the present invention have found that the halogenated zinc phthalocyanine pigment tends to exhibit a strong orientation at azimuths of 45° to 55°. The small slope of the approximate line therefore means that significant increase of orientation intensity, which tends to occur especially in halogenated zinc phthalocyanine pigments, is suppressed.

The halogenated zinc phthalocyanine pigment having an orientation parameter (C) in the above range contributes to achievement of high brightness when used as a green pigment for color filters. The reason for this effect is not clear but presumably it is because the halogenated zinc phthalocyanine pigment having an orientation parameter (C) of −0.006 to 0.006 is less likely to be oriented in the color filer, and therefore the use of the halogenated zinc phthalocyanine pigment suppresses scattering of white transmitted light. When the halogenated zinc phthalocyanine pigment having an orientation parameter (C) in the above range is used as a green pigment for color filters, higher contrast also tends to be achieved. This is also presumably for the same reason as above.

The orientation parameter (C) is preferably −0.0055 to 0.0055 and more preferably −0.0050 to 0.0050, in terms of easily achieving higher brightness and contrast. Similar effects seem to be achieved when the absolute value of the orientation parameter (C) is small, whether it is + (positive) or − (negative). However, as a result of studies, the inventors have found that the halogenated zinc phthalocyanine pigment tends to exhibit+(positive) values. The orientation parameter (C) is therefore further preferably 0 to 0.0055 and particularly preferably 0.001 to 0.0050.

The average primary particle size of the halogenated zinc phthalocyanine pigment is preferably 30 nm or less, and more preferably 25 nm or less, in terms of easily achieving higher brightness and contrast. The average primary particle size of the halogenated zinc phthalocyanine pigment may be 10 nm or more. Here, the average primary particle size is the average value of the long diameters of the primary particles and can be obtained by measuring the long diameters of the primary particles in the same way as the measurement of the average aspect ratio described below.

The average aspect ratio of the primary particles of the halogenated zinc phthalocyanine pigment is, for example, 1.2 or more, 1.3 or more, 1.4 or more, or 1.5 or more. The average aspect ratio of the primary particles of the halogenated zinc phthalocyanine pigment is, for example, less than 2.0, 1.8 or less, 1.6 or less, or 1.4 or less. The halogenated zinc phthalocyanine pigment having such an average aspect ratio provides higher contrast.

The halogenated zinc phthalocyanine pigment having an average aspect ratio of primary particles in the range of 1.0 to 3.0 preferably does not include primary particles with an aspect ratio of 5 or more, more preferably does not include primary particles with an aspect ratio of 4 or more, and even more preferably does not include primary particles with an aspect ratio exceeding 3.

The aspect ratio and the average aspect ratio of primary particles can be measured by the following method. First, the particles in the field of view are imaged with a transmission electron microscope (e.g., JEM-2010 from JEOL Ltd.). The longer diameter (long diameter) and the shorter diameter (short diameter) of a primary particle present in the two-dimensional image are then measured, and the ratio of the long diameter to the short diameter is defined as the aspect ratio of the primary particle. The average values of the long diameters and the short diameters for 40 primary particles are determined, and the ratio of the long diameter to the short diameter is calculated using these values and defined as the average aspect ratio. The halogenated zinc phthalocyanine pigment as the sample is dispersed ultrasonically in a solvent (e.g., cyclohexane) and then imaged with a microscope. A scanning electron microscope may be used instead of the transmission electron microscope.

The halogenated zinc phthalocyanine pigment described above can improve the brightness and contrast of green color filters and is therefore suitable as a green pigment for color filters.

<Production Method for Halogenated Zinc Phthalocyanine Pigment>

A production method for a halogenated zinc phthalocyanine pigment of one embodiment has a first step of preparing a halogenated zinc phthalocyanine crude pigment and a second step of pigmenting the halogenated zinc phthalocyanine crude pigment (pigmentation step).

In the first step, a halogenated zinc phthalocyanine crude pigment is prepared. For example, the halogenated zinc phthalocyanine crude pigment is obtained by precipitating a halogenated zinc phthalocyanine immediately after synthesis (e.g., aggregates of halogenated zinc phthalocyanine) and contains one or more halogenated zinc phthalocyanines with different numbers of halogen atoms.

The first step includes, for example, a step of synthesizing a halogenated zinc phthalocyanine by a known production method such as a chlorosulfonic acid method, a halogenated phthalonitrile method, or a melting method, and a step of precipitating the synthesized halogenated zinc phthalocyanine to produce a halogenated zinc phthalocyanine crude pigment. The step of synthesizing a halogenated zinc phthalocyanine may be, for example, a step of synthesizing a halogenated zinc phthalocyanine using a compound that reacts with water to generate an acid. Examples of the method of synthesizing a halogenated zinc phthalocyanine using a compound that reacts with water to generate an acid include the chlorosulfonic acid method and the melting method.

The chlorosulfonic acid method involves, for example, dissolving zinc phthalocyanine in a sulfur oxide solvent such as chlorosulfonic acid and halogenating the solution with chlorine gas or bromine. The reaction is carried out, for example, at temperatures of 20 to 120° C. and for 3 to 20 hours. In the chlorosulfonic acid method, the sulfur oxide solvent such as chlorosulfonic acid is the compound that reacts with water to generate an acid. For example, chlorosulfonic acid reacts with water to generate hydrochloric acid and sulfuric acid.

The halogenated phthalonitrile method involves, for example, synthesizing a corresponding halogenated zinc phthalocyanine using phthalic acid or phthalodinitrile in which some or all of the hydrogen atoms of the aromatic ring are substituted with halogen atoms such as chlorine as well as bromine, and zinc metal or metal salt, as starting materials as appropriate. In this case, a catalyst such as ammonium molybdate may be used if necessary. The reaction is carried out, for example, at temperatures of 100 to 300° C. and for 7 to 35 hours.

The melting method involves, for example, halogenating zinc phthalocyanine with a halogenating agent in a melt approximately at 10 to 170° C. composed of one compound or a mixture of two or more compounds serving as a solvent in halogenation, such as aluminum halides such as aluminum chloride and aluminum bromide, titanium halides such as titanium tetrachloride, alkali metal halides or alkaline earth metal halides such as sodium chloride and sodium bromide (hereinafter referred to as "alkali (earth) metal halides"), and thionyl chloride. In the melting method, the compounds serving as a solvent in halogenation, such as aluminum halides, titanium halides, alkali (earth) metal halides, and thionyl chloride, are the compound that reacts with water to generate an acid. For example, aluminum chloride reacts with water to produce hydrochloric acid.

A preferable aluminum halide is aluminum chloride. In the above method using aluminum halide, the amount of aluminum halide is usually 3 or more times in moles of zinc phthalocyanine, and preferably 10 to 20 times in moles.

Aluminum halide can be used alone, but it is advantageous in operation that aluminum halide is combined with alkali (earth) metal halide, because if so the melting temperature can be reduced. A preferable alkali (earth) metal halide is sodium chloride. The amount of alkali (earth) metal halide added is preferably 1 to 15 parts by mass per 10 parts by mass of aluminum halide within a range that can generate a molten salt.

Examples of the halogenating agent include chlorine gas, sulfuryl chloride, and bromine.

The temperature for halogenation is preferably 10 to 170° C. and more preferably 30 to 140° C. The reaction may be performed under pressure in order to increase the reaction rate. The reaction time may be 5 to 100 hours and is preferably 30 to 45 hours.

The melting method using two or more of the above compounds in combination is preferred because the ratio of a halogenated zinc phthalocyanine with a specific halogen atom composition contained in the halogenated zinc phthalocyanine produced can be controlled as desired by adjusting the ratio of chloride, bromide, and iodide in the molten salt or changing the amount of chlorine gas, bromine, iodine, or the like and the reaction time. In addition, with the melting method, the raw materials are less decomposed during reaction, resulting in higher yields from the raw materials, and the reaction can be performed with an inexpensive system without using strong acids.

In the present embodiment, a halogenated zinc phthalocyanine with a halogen atom composition different from existing halogenated zinc phthalocyanines can be obtained by optimizing the raw material feeding method, catalyst species and the amount used, the reaction temperature, and the reaction time. More specifically, a halogenated zinc phthalocyanine with a halogen atom composition that can be included in the halogenated zinc phthalocyanine pigment can be obtained.

In any of the above methods, after the reaction is completed, the resulting mixture is put into water, an acidic aqueous solution such as hydrochloric acid, or a basic aqueous solution such as sodium hydroxide solution to settle (precipitate) the halogenated zinc phthalocyanine produced. In doing so, when the compound that reacts with water to generate an acid is used, acids such as hydrochloric acid and sulfuric acid are generated, but when a basic aqueous solution is used, acid generation is suppressed. This can suppress encapsulation of the acid in the precipitate and can suppress residue of the acid in the crude pigment. If the crude pigment encapsulates the acid, the acid may promote particle aggregation during pigmentation and prevents the pigment particles from becoming finer. However, the above method can reduce the acid encapsulated in the crude pigment and provides finer pigment particles.

The first step may further include a post-treatment step of subjecting the precipitate to post-treatment after the precipitating step.

The first step may further include, for example, a step of filtering the precipitate (first post-treatment step). The first post-treatment step may be a step of filtering and washing the precipitate, or may be a step of filtering, washing, and drying the precipitate. The washing may be performed, for example, using an aqueous solvent such as water, aqueous sodium hydrogen sulfate solution, aqueous sodium hydrogen carbonate solution, or aqueous sodium hydroxide solution. In the washing, an organic solvent such as acetone, toluene, methyl alcohol, ethyl alcohol, or dimethylformamide may be used if necessary. For example, after washing with an aqueous solvent, washing with an organic solvent may be performed. The washing may be repeated multiple times (e.g., two to five times). Specifically, it is preferable to perform washing until the pH of the filtrate is equal to the pH of water used in washing (e.g., the difference between them is 0.2 or less).

The first step may further include, for example, a step of dry-grinding the precipitate (second post-treatment step). The dry grinding may be performed in a pulverizer such as an attritor, a ball mill, a vibration mill, or a vibration ball mill. The dry grinding may be performed with heating (e.g., with heating such that the temperature inside the pulverizer is 40° C. to 200° C.). After dry grinding, washing with water may be performed. Washing with water after dry grinding (especially after dry grinding with an attritor) can further reduce the amount of acid encapsulated in the crude pigment. The washing may be either washing with water (washing with water lower than 40° C.) or washing with hot water (washing with water at 40° C. or higher). It is preferable that washing is performed until the pH of the filtrate is equal to the pH of water used in washing (e.g., the difference between them is 0.2 or less), in the same manner as in the first post-treatment step. During or before washing with water, a process of improving the wettability of the precipitate (e.g., a process of bringing the precipitate into contact with a water-soluble organic solvent such as methanol) may be performed. Dry grinding and washing may be repeated multiple times.

The first step may further include, for example, a step of kneading the precipitate together with water (third post-treatment step). The third post-treatment step can further reduce the amount of acid encapsulated in the crude pigment. The kneading can be performed using, for example, a kneader, a mix muller, or the like. The kneading may be performed with heating. For example, the temperature of the water may be 40° C. or higher. An inorganic salt may be added to the water. In this case, at least part of the inorganic salt can be present in the solid form to increase the force applied during kneading. An organic solvent (e.g., the organic solvent that can be used in the second step described below) may be used during kneading, but it is preferable that the amount of organic solvent used is smaller than the amount of water used, and it is more preferable that no organic solvent is used. After kneading, washing may be performed in the same manner as in the first post-treatment step. Kneading and washing may be repeated multiple times.

The first step may further include, for example, a step of heating (e.g., boiling) the precipitate in water (fourth post-treatment step). The fourth post-treatment step can further reduce the amount of acid encapsulated in the crude pigment. The heating temperature in water may be, for example, 40° C. or higher and the boiling point or lower, and the heating time may be, for example, 1 to 300 minutes. An organic solvent (e.g., the organic solvent that can be used in the second step described below) may be mixed in the water. The amount of organic solvent mixed is preferably 20 parts by mass or less per 100 parts by mass of water. In the fourth post-treatment step, in terms of further removing the acid, the precipitate may be washed after heating in water, or the precipitate may be washed after heating in water and, in addition, heating in water and washing may be repeated one or more times (preferably two or more times). The washing may be performed in the same manner as in the first post-treatment step.

In the present embodiment, two or more steps among the first to fourth post-treatment steps described above may be carried out. When two or more steps among the first to fourth post-treatment steps are carried out, the steps may be performed in any order.

The above first step produces a halogenated zinc phthalocyanine crude pigment. As described above, in the present embodiment, the precipitate obtained in the first step may be used as it is as the halogenated zinc phthalocyanine crude pigment, or the precipitate subjected to the post-treatment step (at least one step among the first to fourth post-treatment steps) may be used as the halogenated zinc phthalocyanine crude pigment. When water is used in the second step, drying need not be performed in the first step. In other words, when water is used in the second step, the undried halogenated zinc phthalocyanine crude pigment obtained in the first step (a mixture of the halogenated zinc phthalocyanine crude pigment and water) may be used in the second step.

The arithmetic standard deviation of the particle size distribution of the halogenated zinc phthalocyanine crude pigment is, for example, 15 nm or more. The arithmetic standard deviation of the particle size distribution of the halogenated zinc phthalocyanine crude pigment is, for example, 1500 nm or less. When the arithmetic standard deviation of the particle size distribution of the halogenated zinc phthalocyanine crude pigment is in such a range, finer pigment particles can be easily obtained. The arithmetic standard deviation of the particle size distribution of the halogenated zinc phthalocyanine crude pigment can be measured using a dynamic light scattering particle size distribution analyzer, specifically with the following method and conditions.

(Method)

A dispersion is produced by dispersing 2.48 g of the halogenated zinc phthalocyanine crude pigment with 1.24 g of BYK-LPN6919 from BYK-Chemie GmbH, 1.86 g of UNIDIC ZL-295 from DIC Corporation, and 10.92 g of propylene glycol monomethyl ether acetate for two hours with a paint shaker from Toyo Seiki Seisaku-sho, Ltd. using 0.3 to 0.4 mm zircon beads. After the zircon beads are removed with a nylon mesh, 0.02 g of the dispersion is diluted with 20 g of propylene glycol monomethyl ether acetate to yield a dispersion for particle size distribution measurement.

(Conditions)

Measuring instrument: dynamic light scattering particle size distribution analyzer LB-550 (from HORIBA, Ltd.)

Measuring temperature: 25° C.

Measurement sample: dispersion for particle size distribution measurement

Data analysis conditions: scattered light intensity-based particle size, dispersion medium refractive index 1.402

In the second step, the halogenated zinc phthalocyanine crude pigment obtained in the first step is pigmented.

In one aspect, the second step includes a step of grinding the halogenated zinc phthalocyanine crude pigment (hereinafter referred to as "grinding step") by pressing a mixture containing the halogenated zinc phthalocyanine crude pigment and an organic solvent (hereinafter referred to as "mixture (A)") between a pair of opposing members (for example, plate-shaped members) while rotating one or both of the pair of members.

The above grinding step can make the halogenated zinc phthalocyanine crude pigment finer and can control the orientation thereof at the same time. The grinding step can specifically be carried out using a Hoover muller (also called an automatic Hoover muller). In this case, the pair of opposing members are glass plates, and the halogenated zinc phthalocyanine crude pigment is ground by applying a load from above one of the glass plates to press the mixture (A) while rotating the one glass plate in a direction perpendicular to the opposing direction.

The amount of mixture (A) may be any amount as long as the mixture (A) does not protrude from between the pair of members that press the mixture (A) during grinding, and may be adjusted as appropriate according to the size of the members.

The pressing force (e.g., the magnitude of the load applied from above the glass plate) is preferably 5 kPa (kilopascals) or more, more preferably 10 kPa or more, and even more preferably 20 kPa or more in terms of increasing the shear stress on the mixture during grinding. The pressing force is preferably 200 kPa or less, more preferably 100 kPa or less, and even more preferably 50 kPa or less in terms of preventing crushing of pigment particles.

The conditions of rotating the member are preferably 50 to 3000 times at 30 to 300 rpm, more preferably 60 to 1000 times at 50 to 200 rpm, and even more preferably 70 to 300 times at 70 to 150 rpm in terms of increasing the shear stress on the mixture during grinding. When both of the pair of members are rotated, the above rotation speed is the rotation speed of the other member when one of the pair of members is assumed to be stationary.

In the grinding step, since the mixture (A) is spread on the surface of the member by rotation of the member, the pressing may be released after the member is rotated several times, and the mixture (A) spread on the surface of the member may be brought to the center of the member and then ground again by pressing and rotation. In this case, the above preferred rotation speed means the total rotation number.

The temperature during grinding (e.g., the temperature of the surface of the member in contact with the mixture) is, for example, 0 to 100° C. In the grinding step, the halogenated phthalocyanine crude pigment may be ground with cooling or heating.

It is preferable to use an organic solvent that does not dissolve the halogenated zinc phthalocyanine crude pigment and an inorganic salt described below. As the organic solvent, it is preferable to use an organic solvent that can suppress crystal growth. A water-soluble organic solvent can be suitably used as such an organic solvent. Examples of the organic solvent that can be used include diethylene glycol, glycerin, ethylene glycol, propylene glycol, 1,3-propanediol, 1,3-butanediol, liquid polyethylene glycol, liquid polypropylene glycol, 2-(methoxymethoxy)ethanol, 2-butoxyethanol, 2-(isopentyloxy)ethanol, 2-(hexyloxy)ethanol, diethylene glycol monomethyl ether, diethylene glycol monoethyl ether, diethylene glycol monobutyl ether, triethylene glycol, triethylene glycol monomethyl ether, 1-methoxy-2-propanol, 1-ethoxy-2-propanol, dipropylene glycol, dipropylene glycol monomethyl ether, dipropylene glycol monoethyl ether, trimethyl phosphate, 4-butyrolactone, propylene carbonate, N-methyl-2-pyrrolidone, methanol, ethylene cyanohydrin, 1,2,4-butanetriol, and 1,2,5-pentanetriol. The organic solvents can be used singly or in combination of two or more.

As the organic solvent, it is preferable to use a triol with 3 to 5 carbon atoms, in terms of high viscosity and ease of applying a sufficient shear stress to the mixture (A). It is more preferable to use at least one selected from the group consisting of 1,2,4-butanetriol, glycerin, and 1,2,5-pentanetriol, and it is even more preferable to use 1,2,4-butanetriol.

The amount of organic solvent (e.g., water-soluble organic solvent) used is not limited but preferably 1 to 500 parts by mass per 100 parts by mass of the halogenated zinc phthalocyanine crude pigment. The amount of organic solvent (e.g., water-soluble organic solvent) used may be 30 parts by mass or more or 50 parts by mass or more, and may be 400 parts by mass or less or 200 parts by mass or less, per 100 parts by mass of the halogenated zinc phthalocyanine crude pigment.

In the grinding step, the halogenated zinc phthalocyanine crude pigment may be ground by kneading with an inorganic salt. In other words, in the grinding step, a mixture containing the halogenated zinc phthalocyanine crude pigment, an organic solvent, and an inorganic salt may be used as the mixture (A). The use of an inorganic salt can increase the force applied to the halogenated zinc phthalocyanine crude pigment during the grinding step to facilitate production of finer pigment particles.

As the inorganic salt, an inorganic salt having solubility in water and/or methanol is preferably used. For example, an inorganic salt such as sodium chloride, potassium chloride, lithium chloride, or sodium sulfate is preferably used. The average particle size of the inorganic salt is preferably 0.5 to 50 μm. Such an inorganic salt can be easily obtained by pulverizing an ordinary inorganic salt.

It is preferable that water is not used in the grinding step. In other words, it is preferable that the mixture (A) used in the grinding step does not contain water. The amount of water used (water content in the mixture) is, for example, 20 parts by mass or less per 100 parts by mass of the halogenated zinc phthalocyanine crude pigment, and may be 10 parts by mass or less or 5 parts by mass or less.

When an inorganic salt and an organic solvent are used in the grinding step, a mixture containing the halogenated zinc phthalocyanine pigment, the inorganic salt, and the organic solvent results, and the organic solvent and the inorganic salt is removed from the mixture, and the solid mainly composed of the halogenated zinc phthalocyanine pigment may be subjected to operation such as washing, filtration, drying, and grinding, if necessary.

The washing may be washing with water, washing with hot water, washing with an organic solvent (e.g., organic solvent with a low surface tension, such as methanol), and a combination thereof, depending on the kind of the inorganic salt. Washing may be repeated one to five times. When a water-soluble inorganic salt and a water-soluble organic solvent are used, the organic solvent and the inorganic salt can be easily removed by washing with water. If necessary, acid washing or alkali washing may be performed.

The drying after the washing and filtration is, for example, batch or continuous drying in which dehydration and/or solvent removal of the pigment is performed by heating at 80 to 120° C. using a heating source installed in a dryer. Common examples of the dryer include box dryers, band dryers, and spray dryers. Spray drying using a spray dryer is especially preferred because of easy dispersion during preparation of a paste. When an organic solvent is used for washing, vacuum drying at 0 to 60° C. is preferred.

Grinding after drying is an operation not to increase the specific surface area or decrease the average particle size of the primary particles but to break the pigment lumped in drying using a box dryer or band dryer into powder. Examples include grinding by a mortar, a hammer mill, a disk mill, a pin mill, a jet mill, and the like.

In another aspect, the second step includes a step of preparing a mixture (hereinafter referred to as "mixture (B)") containing the crude pigment and water and having a pH of 2 to 12, and heating the mixture (B) under a pressurized atmosphere (heating and pressurizing step).

The heating and pressurizing step can make the halogenated zinc phthalocyanine crude pigment finer and can control the orientation thereof at the same time. The heating and pressurizing step can specifically be carried out using a heating and pressurizing device such as an autoclave. In an autoclave, the mixture (B) is placed in a vessel that can be heated and sealed in the autoclave, and the mixture (B) is heated in the sealed vessel, so that the water contained in the mixture becomes water vapor, and the water vapor can create a pressurized atmosphere in the sealed space in the vessel.

The amount of mixture (B) used is not limited and may be changed as appropriate according to the size of the device used.

The water content in the mixture (B) is preferably 300 parts by mass or more, more preferably 450 parts by mass or more, and even more preferably 600 parts by mass or more, per 100 parts by mass of the halogenated zinc phthalocyanine crude pigment, in terms of easily setting the pressure of the pressurized atmosphere to a suitable range and easily obtaining a halogenated zinc phthalocyanine pigment finer and less oriented. The water content in the mixture (B) is preferably 6000 parts by mass or less, more preferably 4500 parts by mass or less, and even more preferably 3000 parts by mass or less, per 100 parts by mass of the halogenated zinc phthalocyanine crude pigment, in terms of easily setting the pressure of the pressurized atmosphere to a suitable range and easily producing a halogenated zinc phthalocyanine pigment finer and less oriented. The amount of water in the mixture (B) is preferably an amount with which the amount of water in the vessel becomes 10 to 90% by volume, and more preferably 40 to 80% by volume, per 100% by volume of the standard volume of the vessel.

The pH of the mixture is preferably 11.5 or less, and more preferably 10 or less, in terms of allowing the halogenated zinc phthalocyanine to aggregate adequately and easily obtaining a halogenated zinc phthalocyanine pigment finer and less oriented. The pH of the mixture is preferably 2.5 or more and more preferably 3 or more in terms of preventing the halogenated zinc phthalocyanine from excessively aggregating. The above pH is the pH at 25° C. The pH of the mixture can be adjusted, for example, using a pH adjuster. A commonly known pH adjuster such as hydrochloric acid, sulfuric acid, phosphoric acid, potassium hydroxide, or sodium hydroxide can be used. The above pH is the pH at the start of heating, but in the present embodiment, it is more preferable that the pH during heating is within the above range.

The heating and pressurizing step includes, for example, a step of placing the mixture (B) in a sealed space and then increasing the ambient temperature of the sealed space to a predetermined temperature (final temperature), and a step of holding the ambient temperature at the predetermined temperature (final temperature).

The heating start temperature (e.g., the ambient temperature in the sealed space immediately after the mixture (B) is placed in the sealed space) may be, for example, room temperature (20 to 30° C.).

The predetermined temperature (final temperature) is preferably 80° C. or higher and more preferably 100° C. or higher, in terms of easily breaking the aggregation of primary particles. The predetermined temperature (final temperature attained) is preferably 250° C. or lower and more preferably 230° C. or lower in terms of easily preventing coarsening of primary particles. After the predetermined temperature is reached, it is preferable to hold 80 to 250° C., and it is more preferable to hold 100 to 230° C.

The temperature increase rate is preferably 10° C./min or less, more preferably 5° C./min or less, and even more preferably 3° C./min or less, in terms of easily adjusting the particle size and easily breaking the aggregation of primary particles. The temperature increase rate may be 0.1° C./min or more, may be 0.5° C./min or more, or may be 1° C./min or more.

The holding time at a predetermined temperature (final temperature) is preferably 30 minutes or longer and more preferably 60 minutes (one hour) or longer, in terms of easily adjusting the particle size. The holding time at a predetermined temperature (final temperature) is preferably 30 hours or shorter and more preferably 10 hours or shorter, in terms of easily preventing coarsening of primary particles.

The pressure of the pressurized atmosphere is preferably 0.05 MPa or higher, more preferably 0.1 MPa or higher, and even more preferably 0.2 MPa or higher at the time when the predetermined temperature is reached, in terms of easily breaking the aggregation of primary particles. The pressure of the pressurized atmosphere is preferably 2 MPa or lower, more preferably 1.8 MPa or lower, and even more preferably 1.7 MPa or lower at the time when the predetermined temperature is reached, in terms of preventing coarsening of primary particles.

Heating (e.g., increasing and holding the temperature) in the heating and pressurizing step may be performed while stirring the mixture (B). The mixture (B) can be stirred, for example, by using an autoclave equipped with a stirring device such as a paddle or propeller in the sealed space as a heating and pressurizing device. For example, a concentric twin-shaft stirrer from ASADA IRON WORKS, CO., LTD. can be used as such a stirring device. The stirring speed may be, for example, 30 to 200 rpm.

In the heating and pressurizing step, an inert gas such as nitrogen or argon may be introduced into the sealed vessel.

After the heating and pressurizing step (e.g., after the holding time ends), the treated product obtained by the heating and pressurizing process for the mixture (B) is cooled, for example, by standing to cool, resulting in a solid mainly composed of the halogenated zinc phthalocyanine pigment. After cooling, the solid mainly composed of the halogenated zinc phthalocyanine pigment may be subjected to operation such as washing, filtration, drying, and grinding, if necessary, in the same manner as after the grinding step described above.

EXAMPLES

The present invention will be described in more detail below using examples and comparative examples, but the present invention is not limited to the following examples.

<Synthesis of Crude Pigment>

(Synthesis of Crude Pigment A1)

In a 300 ml flask, 91 g of sulfuryl chloride (from FUJIFILM Wako Pure Chemical Corporation), 109 g of aluminum chloride (from KANTO CHEMICAL CO., INC.), 15 g of sodium chloride (from Tokyo Chemical Industry Co., Ltd.), 30 g of zinc phthalocyanine (from DIC Corporation), and 230 g of bromine (from FUJIFILM Wako Pure Chemical Corporation) were fed. The temperature was increased to 130° C. and held at 130° C. for 40 hours. The reaction mixture was taken out into water, then filtered and washed with water to yield a hydrous crude pigment WA1. Subsequently, 10 g of the hydrous crude pigment WA1 was dried at 90° C. for 14 hours to yield 4 g of a halogenated zinc phthalocyanine crude pigment (crude pigment A1). Washing with water was performed until the difference between the pH of the filtrate and the pH of the water used for washing was ±0.2.

The crude pigment A1 was analyzed by mass spectrometry using JMS-S3000 from JEOL Ltd. and identified as a halogenated zinc phthalocyanine with an average chlorine number of 1.8 and an average bromine number of 13.2. The delay time during mass spectrometry was 500 ns, the laser intensity was 44%, and the resolving power value of the peak at m/z=1820 to 1860 was 31804.

(Synthesis of Crude Pigment A2)

In a 300 ml flask, 91 g of sulfuryl chloride (from FUJIFILM Wako Pure Chemical Corporation), 109 g of aluminum chloride (from KANTO CHEMICAL CO., INC.), 19 g of sodium chloride (from Tokyo Chemical Industry Co., Ltd.), 28 g of zinc phthalocyanine (from DIC Corporation), and 230 g of bromine (from FUJIFILM Wako Pure Chemical Corporation) were fed. The temperature was increased to 140° C. and held at 140° C. for 40 hours. The reaction mixture was taken out into water, then filtered and washed with water to yield a hydrous crude pigment WA2. Subsequently, 10 g of the hydrous crude pigment WA2 was dried at 90° C. for 14 hours to yield 4 g of a halogenated zinc phthalocyanine crude pigment (crude pigment A2). Washing with water was performed until the difference between the pH of the filtrate and the pH of the water used for washing was ±0.2. This crude pigment A2 is referred to as Reference Example 1.

The crude pigment A2 (Reference Example 1) was analyzed by mass spectrometry using JMS-S3000 from JEOL Ltd. and identified as a halogenated zinc phthalocyanine with an average chlorine number of 2.0 and an average bromine number of 13.5. The delay time during mass spectrometry was 500 ns, the laser intensity was 46%, and the resolving power value of the peak at m/z=1820 to 1860 was 30582.

Example 1

In an automatic Hoover muller (from Toyo Seiki Seisaku-sho, Ltd.), 0.3 g of the crude pigment A1, 3 g of pulverized sodium chloride, and 0.9 g of 1,2,4-butanetriol were fed and kneaded by applying a load of 150 lbs from above a glass plate and rotating the glass plate 25 times at 25° C. The kneaded product was scraped off with a spatula, fed again, and kneaded again by applying a load of 150 lbs from above the glass plate and rotating the glass plate 25 times at 25° C. Subsequently, the kneaded product was scraped off with a spatula, fed again, and kneaded again by applying a load of 150 lbs from above the glass plate and rotating the glass plate 50 times at 25° C. All the kneading was performed at 100 rpm, so the total grinding time was one minute.

Subsequently, the kneaded product obtained above was taken out into 200 g of hot water and stirred for one hour. The product was then filtered, washed with hot water, dried, and pulverized to yield a green pigment G1.

Example 2

A green pigment G2 was obtained in the same manner as in Example 1, except that the crude pigment A2 was used instead of the crude pigment A1.

Example 3

In a 1 L autoclave, 75 g of the hydrous crude pigment WA2 (crude pigment A2:water (mass ratio)=6:4) and 525 g of water were fed. After the hydrogen ion exponent of the material to be treated (a mixture of the hydrous crude pigment WA2 and water) was adjusted to pH 5.5 using hydrochloric acid at a concentration of 5% by mass, the autoclave was sealed. The pH was measured with a PH71 personal pH meter from Yokogawa Electric Corporation. Subsequently, the temperature was increased to 200° C. over two hours with stirring and held at 200° C. for five hours. The pressure in the autoclave at the time when the temperature reached 200° C. was 1.55 MPa. After standing to cool to room temperature, the resulting treated material was filtered, washed with hot water, dried, and pulverized to yield a green pigment G3.

Reference Example 2

In a twin-arm kneader, 45 g of the crude pigment A2, 450 g of pulverized sodium chloride, and 90 g of water were fed and kneaded at 60° C. for six hours. After kneading, the kneaded product was taken out into 2 kg of water at 80° C. and stirred for one hour. The product was then filtered, washed with hot water, dried, and pulverized to yield a pre-pigment GP.

Example 4

In an automatic Hoover muller (from Toyo Seiki Seisaku-sho, Ltd.), 0.3 g of the pre-pigment GP, 3 g of pulverized sodium chloride, and 0.9 g of 1,2,4-butanetriol were fed and kneaded by applying a load of 150 lbs from above a glass plate and rotating the glass plate 25 times at 25° C. The kneaded product was scraped off with a spatula, fed again, and kneaded again by applying a load of 150 lbs from above the glass plate and rotating the glass plate 25 times at 25° C. Subsequently, the kneaded product was scraped off with a spatula, fed again, and kneaded again by applying a load of 150 lbs from above the glass plate and rotating the glass plate 50 times at 25° C. All the kneading was performed at 100 rpm, so the total grinding time was one minute.

Subsequently, the kneaded product obtained above was taken out into 200 g of hot water and stirred for one hour. The product was then filtered, washed with hot water, dried, and pulverized to yield a green pigment G5.

Example 5

In a twin-arm kneader, 12 g of the pre-pigment GP, 450 g of pulverized sodium chloride, and 61 g of 1,2,4-butanetriol were fed and kneaded at 20° C. for 30 minutes. After kneading, the kneaded product was taken out into 2 kg of water at 20° C. and stirred for one hour. The product was then filtered, washed with hot water, dried, and pulverized to yield a green pigment G6.

Comparative Example 1

In a twin-arm kneader, 40 g of the crude pigment A2, 400 g of pulverized sodium chloride, and 63 g of diethylene glycol were fed and kneaded at 80° C. for eight hours. After kneading, the kneaded product was taken out into 2 kg of water at 80° C. and stirred for one hour. The product was then filtered, washed with hot water, dried, and pulverized to yield a green pigment G4.

<Evaluation>

(Measurement of Average Primary Particle Size)

The green pigments (G1 to G6) were dispersed ultrasonically in cyclohexane and then imaged with a microscope. The average particle size of primary particles (average primary particle size) was calculated from the average value of 40 primary particles that constitute an aggregate on a two-dimensional image. The results are listed in Table 1.

(Measurement of Orientation Parameters (A) and (C))

The orientation parameters (A) and (C) of the crude pigment A2 and the green pigments G1 to G6 were measured by the following method. The example using the crude pigment A2 is referred to as Reference Example 1.

First, a dispersion (MG) was produced by dispersing 0.992 g of the crude pigment A2, the pre-pigment GP, or the green pigment (G1 to G8) with 0.496 g of BYK-LPN6919 (solution with a solid content of 60% by mass from BYK-Chemie GmbH), 0.744 g of UNIDIC ZL-295 (solution with a solid content of 40% by mass from DIC Corporation), and 4.368 g of propylene glycol monomethyl ether acetate for two hours with a paint shaker from Toyo Seiki Seisaku-sho, Ltd. using 15.2 g of 0.3 to 0.4 mm zircon beads.

An evaluation composition (CG) for measuring orientation was producing by mixing 3.000 g of the dispersion (MG), 0.735 g of UNIDIC ZL-295 (from DIC Corporation), and 0.165 g of propylene glycol monomethyl ether acetate with a paint shaker.

The evaluation composition (CG) was spin-coated on a glass substrate, dried at 90° C. for three minutes, and then heated at 230° C. for one hour. A glass substrate for orientation evaluation having a colored film on the glass substrate was thus produced, in which a mass ratio between the crude pigment, the pre-pigment, or the green pigment (G1 to G6) and the resin (the solid content in UNIDIC ZL-295 and the solid content in BYK-LPN6919) was 1:1.25.

The thickness of the colored film obtained by heating at 230° C. for one hour was set to 4.0 μm by adjusting the spin rotation speed during spin coating. Corning (registered trademark) EAGLE XG (1.1 mm thick) was used as the glass substrate.

GI-WAXS measurement of the colored film on the glass substrate for orientation evaluation was performed under room temperature using the beamline BL03XU Hutch 1 owned by Advanced Softmaterial Beamline Consortium in the high-brilliance synchrotron radiation facility SPring-8 by grazing-incidence wide-angle X-ray scattering (GI-WAXS) as a measurement mode. The camera length was 102.5 mm, the X-ray wavelength was 0.1 nm, the X-ray incidence angle was 0.06°, and the exposure time was 5 seconds.

The orientation parameters (A) and (C) were determined using two-dimensional scattering images obtained by GI-WAXS measurement. The results are listed in Table 1. The two-dimensional scattering images obtained in Reference Example 1, Comparative Example 1, and Example 3 are illustrated in (a), (b), and (c), respectively, in FIG. 1. The azimuth profiles in the azimuth range of 5° to 89° derived from these two-dimensional scattering images (graphs with the normalized average scattering intensity (normalized intensity) on the vertical axis and the azimuth on the horizontal axis) are illustrated in (a), (b), and (c) in FIG. 2. The azimuth profiles in the azimuth range of 45° to 55° (graphs with the normalized average scattering intensity (normalized intensity) on the vertical axis and the azimuth on the horizontal axis) are illustrated in (a), (b), and (c) in FIG. 3. FIG. 2 illustrates the graphs on the orientation parameter (A), and FIG. 3 illustrates the graphs on the orientation parameter (C).

As illustrated in FIG. 1, in Reference Example 1 ((a) in FIG. 1), the intensity in the 90° direction is large, and in Comparative Example 1 ((b) in FIG. 1), the intensity in the oblique direction is large, whereas in Example 3 ((c) in FIG. 1), the intensity is uniform and the scattering is annular, suggesting that the orientation is mitigated in Example 3 from a qualitative point of view. As illustrated in (c) in FIG. 2, in Example 3, the minimum/maximum normalized average scattering intensity is 0.78/1.07, and the orientation parameter (A) satisfies 0.70 to 1.15. As illustrated in (c) in FIG. 3, in Example 3, the slope of the linear approximation is 0.026, and the orientation parameter (C) satisfies −0.006 to 0.006.

(Contrast and Brightness Evaluation)

A dispersion was produced by dispersing 1.65 g of Pigment Yellow 138 (CHROMOFINE Yellow 6206EC from Dainichiseika Color & Chemicals Mfg. Co., Ltd.) with 3.85 g of DISPERBYK-161 (BYK-Chemie GmbH) and 11.00 g of propylene glycol monomethyl ether acetate for two hours with a paint shaker from Toyo Seiki Seisaku-sho, Ltd. using 0.3 to 0.4 mm zircon beads.

A yellow composition for toning (TY1) was producing by mixing 4.0 g of the dispersion, 0.98 g of UNIDIC ZL-295, and 0.22 g of propylene glycol monomethyl ether acetate with a paint shaker.

A pigment dispersion for color filters (MG1) was produced by dispersing 2.48 g of the green pigment (G1 to G6) with 1.24 g of BYK-LPN6919 from BYK-Chemie GmbH, 1.86 g of UNIDIC ZL-295 from DIC Corporation, and 10.92 g of propylene glycol monomethyl ether acetate for two hours with a paint shaker from Toyo Seiki Seisaku-sho, Ltd. using 0.3 to 0.4 mm zircon beads.

An evaluation composition (CG1) for forming green pixel sections for color filters was producing by mixing 4.0 g of the pigment dispersion for color filters (MG1), 0.98 g of UNIDIC ZL-295 from DIC Corporation, and 0.22 g of propylene glycol monomethyl ether acetate with a paint shaker.

The evaluation composition (CG1) was spin-coated on a glass substrate, dried at 90° C. for three minutes, and then heated at 230° C. for one hour. A glass substrate for contrast evaluation having a colored film on the glass substrate was thus produced. The thickness of the colored film obtained by heating at 230° C. for one hour was set to 1.8 μm by adjusting the spin rotation speed during spin coating. Corning (registered trademark) EAGLE XG (1.1 mm thick) was used as the glass substrate.

Furthermore, a coating solution obtained by mixing the yellow composition for toning (TY1) and the evaluation composition (CG1) produced above was spin-coated on a glass substrate, dried at 90° C. for three minutes, and then heated at 230° C. for one hour. A glass substrate for brightness evaluation having a colored film on the glass substrate was thus produced. The mixing ratio of the yellow composition for toning (TYl) and the evaluation composition (CG1) and the spin rotation speed during spin coating were adjusted to produce a colored film in which the chromaticity (x, y) of the colored film obtained by heating at 230° C. for one hour was (0.275, 0.570) at Illuminant C. Corning (registered trademark) EAGLE XG (1.1 mm thick) was used as the glass substrate.

The contrast of the colored film on the glass substrate for contrast evaluation was measured with a contrast tester CT-1 from Tsubosaka Electric Co., Ltd. The brightness of the colored film on the glass substrate for brightness evaluation was measured with U-3900 from Hitachi High-Tech Science Corporation. The results are listed in Table 1. The contrast and brightness listed in Table 1 are based on the contrast and brightness of Comparative Example 1 as the standard.

TABLE 1

| | Crude pigment | | Orientation | Orientation | Primary particle | Characteristic value | |
|---|---|---|---|---|---|---|---|
| | | | | | | Contrast (%; | Brightness (%; |
| | Br number | Cl number | parameter (A) | parameter (C) | size [nm] | relative to Std.) | relative to Std.) |
| Example 1 | 13.2 | 1.8 | 0.80/1.14 | 0.0051 | 25 | 122 | 102.6 |
| Example 2 | 13.5 | 2.0 | 0.77/1.13 | 0.0051 | 26 | 129 | 104.5 |
| Example 3 | 13.5 | 2.0 | 0.78/1.07 | 0.0026 | 27 | 134 | 105.2 |
| Example 4 | 13.5 | 2.0 | 0.83/1.12 | 0.0046 | 26 | 133 | 105.3 |

TABLE 1-continued

| | Crude pigment | | Orientation | Orientation | Primary particle | Characteristic value | |
|---|---|---|---|---|---|---|---|
| | Br number | Cl number | parameter (A) | parameter (C) | size [nm] | Contrast (%; relative to Std.) | Brightness (%; relative to Std.) |
| Example 5 | 13.5 | 2.0 | 0.80/1.12 | 0.0051 | 26 | 123 | 103.9 |
| Reference Example 1 | 13.5 | 2.0 | 0.80/1.19 | 0.0086 | — | — | — |
| Reference Example 2 | 13.5 | 2.0 | 0.79/1.16 | 0.0066 | — | — | — |
| Comparative Example 1 | 13.5 | 2.0 | 0.83/1.16 | 0.0071 | 35 | Std. | Std. |

The invention claimed is:

1. A halogenated zinc phthalocyanine pigment comprising chlorine atoms and bromine atoms, wherein an average number of chlorine atoms in the halogenated zinc phthalocyanine pigment is 1.8 to 2.0, wherein an average number of bromine atoms in the halogenated zinc phthalocyanine pigment is 13.2 to 13.5, wherein the halogenated zinc phthalocyanine pigment has an orientation parameter (A) which corresponds to a normalized average scattering intensity at azimuths of 5° to 89° of 0.77 to 1.14, wherein the halogenated zinc phthalocyanine pigment has an orientation parameter (C) of 0.0026 to 0.0051, wherein an average primary particle size of the halogenated zinc phthalocyanine pigment is 25 nm to 30 nm, wherein the orientation parameter (A) is obtained by a method comprising:

providing a coating film containing 1.00 part by mass of the pigment, 0.95 parts by mass of a benzyl methacrylate-methacrylic acid copolymer, and 0.30 parts by mass of a dimethylaminoethyl methacrylate copolymer;

heating the coating film at 230° C. for one hour to form an evaluation coating film having a thickness of 4 μm;

determining each average scattering intensity at scattering angles 2θ in a range of 17° to 21° of the evaluation coating film in the azimuth range of 5° to 89°, said each average scattering intensity being obtained from a two-dimensional scattering image obtained by grazing-incidence X-ray scattering system (GI-WAXS) measurement of the evaluation coating film; and dividing said each average scattering intensity in the azimuth range of 5° to 89° by the average scattering intensity at an azimuth of 45°, thereby obtaining the orientation parameter (A) of the evaluation coating film, wherein the orientation parameter (C) is defined by a method comprising:

obtaining each average scattering intensity at scattering angles 2θ in the range of 17° to 21° in the azimuth range of 45° to 55° from the two-dimensional scattering image;

dividing each average scattering intensity at azimuths of 45° to 55° by the average scattering intensity at an azimuth of 45°, thereby normalized such that a value at an azimuth of 45° is 1;

performing a linear approximation by creating an azimuth profile of an approximate line in the azimuth range of 45° to 55°, wherein in the azimuth profile, the average scattering intensity normalized, that is, a normalized average scattering intensity, is a vertical axis, and the azimuth is a horizontal axis; and obtaining a slope of the approximate line to be defined as the orientation parameter (C).

* * * * *